Aug. 20, 1957     K. P. ROTH     2,803,471
AUTOMOBILE WINDOW GUARD
Filed Dec. 16, 1955
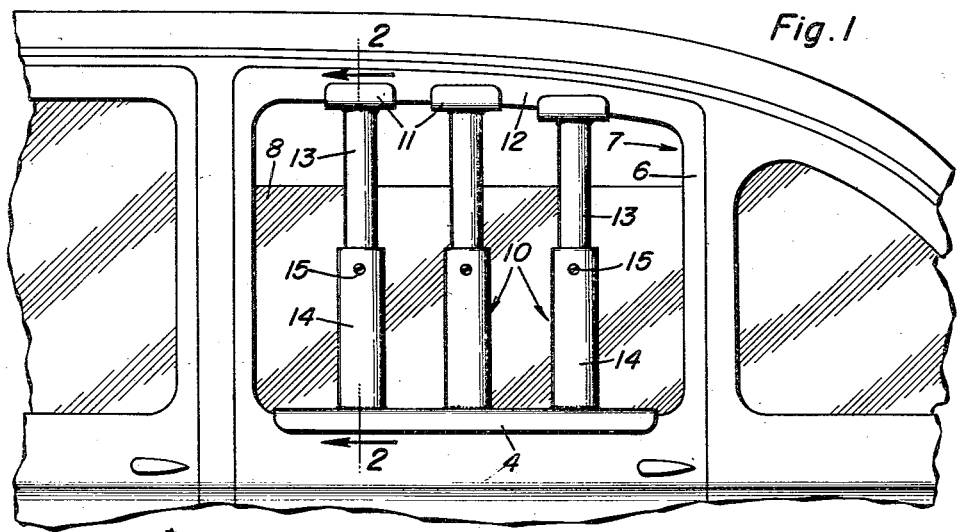
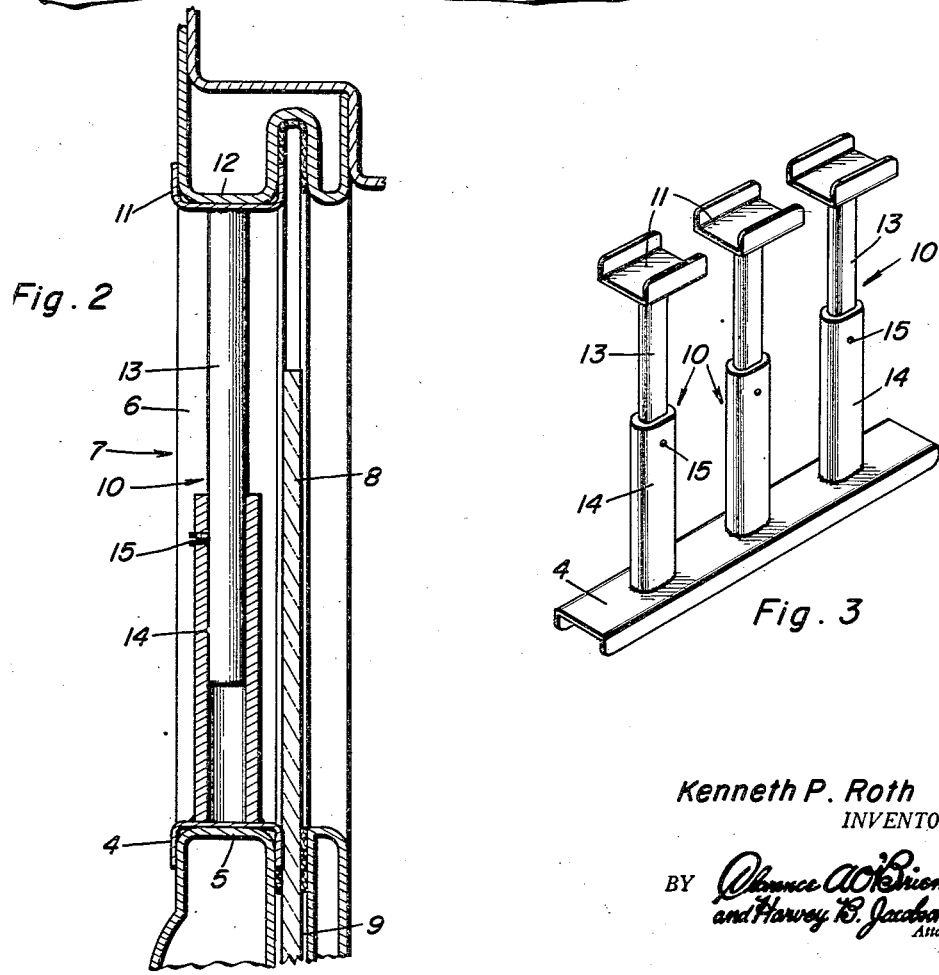
Kenneth P. Roth
INVENTOR.

2,803,471
AUTOMOBILE WINDOW GUARD

Kenneth P. Roth, North Haledon, N. J., assignor of twenty-five percent to Anthony Macri, Paterson, and twenty-five percent to Edward Mutzenback, Midland, N. J.

Application December 16, 1955, Serial No. 553,508

1 Claim. (Cl. 280—150)

The present invention relates to new and useful improvements in window guards particularly for automobiles and has for its primary object to provide, in a manner as hereinafter set forth, novel means for preventing children from falling out the windows of the vehicle.

Another very important object of the invention is to provide a guard of the aforementioned character which is adapted to be expeditiously and firmly but removably mounted in various shapes and sizes of automobile windows without the use of extraneous securing means and, further, without altering said windows structurally or marring same.

Still another important object of the invention is to provide a guard of the character described which, when installed, will interfere in no way with the operation of the usual vertically slidable window glass.

Other objects of the invention are to provide an automobile window guard of the character set forth which will be comparatively simple in construction, strong, durable, attractive in appearance and which may be manufactured at low cost.

These together with other objects and advantages which will become subsequently apparent reside in the details of construction and operation as more fully hereinafter described and claimed, reference being had to the accompanying drawings forming a part hereof, wherein like numerals refer to like parts throughout, and in which:

Figure 1 is a view in side elevation, showing a guard constructed in accordance with the present invention in position in an automobile window;

Figure 2 is a cross-sectional view, taken substantially on the line 2—2 of Figure 1; and Figure 3 is a perspective view of the device.

Referring now to the drawing in detail, it will be seen that the embodiment of the invention which has been illustrated comprises a base in the form of an inverted channel bar 4 of metal, plastic or other suitable material. The bar 4, which may be of any desired dimensions, is adapted to be mounted on the usual outer, lower member 5 of a conventional frame 6 of an automobile window which is designated generally by reference character 7. The window 7 further includes the usual vertically slidable pane 8. As shown to advantage in Figure 2 of the drawing, the well 9 which receives the pane 8 also accommodates the inner flange of the channel bar 4.

Rising from the bar 4 at longitudinally spaced points is a plurality of spaced, parallel, telescopically adjustable posts 10. Substantially channel-shaped heads or members 11 are mounted on the upper ends of the posts 10 in parallelism with the bar 4. The heads 11 are for the reception of the horizontal upper member 12 of the window frame 6.

The posts 10 include upper and lower male and female sections 13 and 14, respectively, of non-circular cross section, as shown. The female sections 14 are of tubular construction and rise from the bar 4. The heads 11 are affixed to the upper ends of the male sections 13. Set screws 15 secure the sections 13 and 14 in adjusted position.

It is thought that the use of the device will be readily apparent from a consideration of the foregoing. To mount the guard in the window 7, the inverted channel bar 4 is positioned longitudinally on the frame member 5. With the set screws 15 loose, the telescopic posts 10 are adjusted to engage the channel-shaped heads 11 firmly beneath the upper member 12 of the frame 6. The set screws 15 are then tightened for firmly securing the guard in position in the window 7 in an obvious manner. The construction and arrangement, it will be observed, is such that the guard interferes in no way with the operation of the pane 8 of the window 7. Of course, to remove the device when desired, the foregoing operation is substantially reversed.

The foregoing is considered as illustrative only of the principles of the invention. Further, since numerous modifications and changes will readily occur to those skilled in the art, it is not desired to limit the invention to the exact construction and operation shown and described, and accordingly all suitable modifications and equivalents may be resorted to, falling within the scope of the invention as claimed.

What is claimed as new is as follows:

An automobile window guard comprising: an inverted channel bar for mounting longitudinally on the lower member of the window frame, a plurality of spaced, independently telescopically adjustable posts rising from said bar, substantially channel-shaped heads on the upper ends of the posts paralleling the bar and engageable with the upper member of the window frame, said posts including slidably but non-rotatably connected male and female sections for maintaining the heads parallel to the bar and in position to engage and straddle the upper frame member, and means for securing said male and remale sections in adjusted position.

References Cited in the file of this patent

UNITED STATES PATENTS

| 958,481 | Drinkwater | May 17, 1910 |
| 1,596,795 | Blakeney | Aug. 17, 1926 |
| 2,459,884 | Kopf | Jan. 25, 1949 |
| 2,676,816 | Kern | Apr. 27, 1954 |

FOREIGN PATENTS

| 124,042 | Sweden | Feb. 15, 1949 |